(No Model.)  6 Sheets—Sheet 2.

R. C. LAMBERT.
Lasting Machine.

No. 238,791.  Patented March 15, 1881.

Witnesses:
E. A. Hemmenway.
Walter E. Lombard.

Inventor:
Richard C. Lambert
by N. C. Lombard
Attorney.

(No Model.)  6 Sheets—Sheet 3.

R. C. LAMBERT.
Lasting Machine.

No. 238,791.  Patented March 15, 1881.

Witnesses:
E. A. Hemmenway
Walter E. Lombard

Inventor
Richard C. Lambert
by N. C. Lombard
Attorney.

(No Model.)  6 Sheets—Sheet 4.

R. C. LAMBERT.
Lasting Machine.

No. 238,791. Patented March 15, 1881.

Witnesses:
E. A. Hemmenway
Walter E. Lombard

Inventor:
Richard C. Lambert
by N. C. Lombard
Attorney.

(No Model.)

R. C. LAMBERT.
Lasting Machine.

No. 238,791. Patented March 15, 1881.

Witnesses:
E. A. Hemmenway
Walter E. Lombard

Inventor:
Richard C. Lambert
by N. C. Lombard
Attorney.

(No Model.) R. C. LAMBERT. 6 Sheets—Sheet 6.
Lasting Machine.
No. 238,791. Patented March 15, 1881.
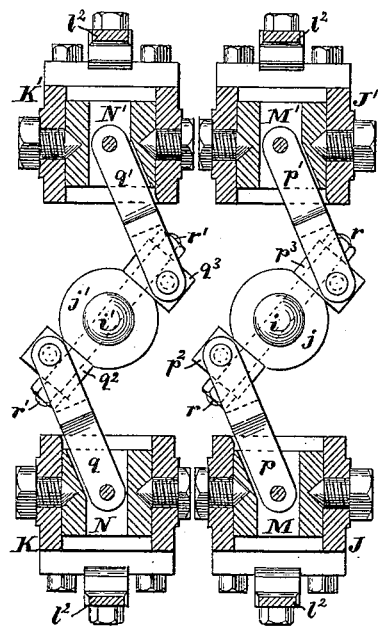
Fig. 6.
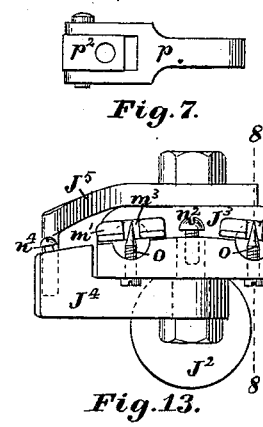
Fig. 7.
Fig. 13.
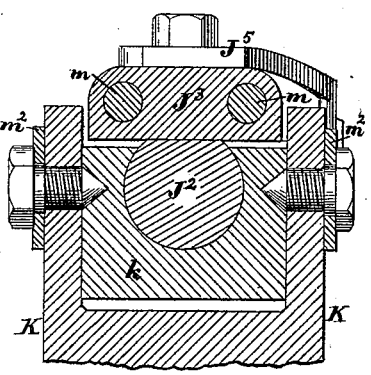
Fig. 11.
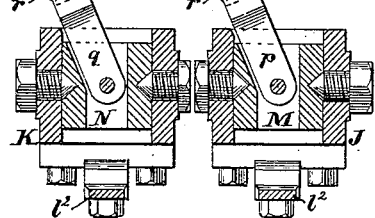
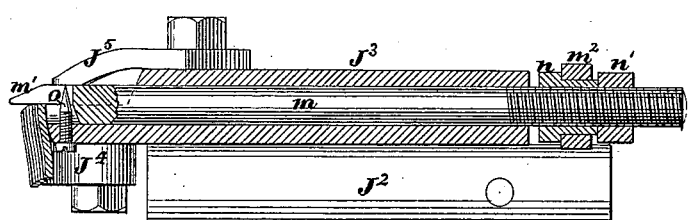
Fig. 14.
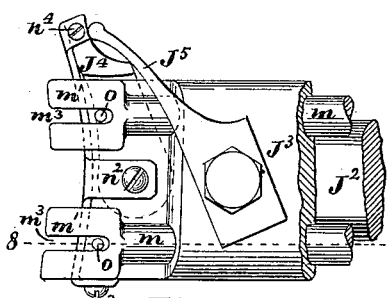
Fig. 12.
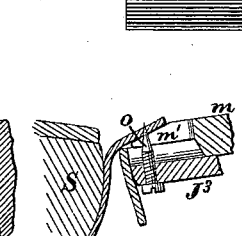
Fig. 15. Fig. 16. Fig. 17.
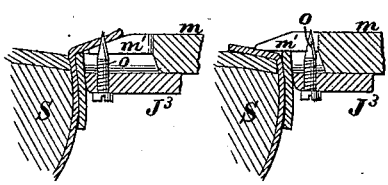
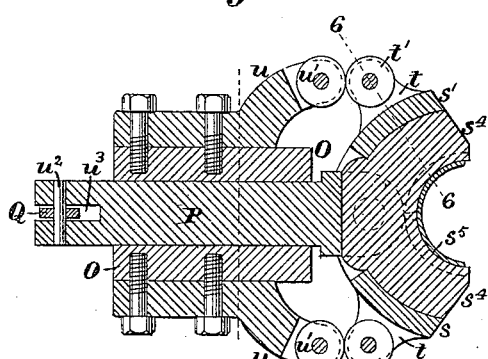
Fig. 9.
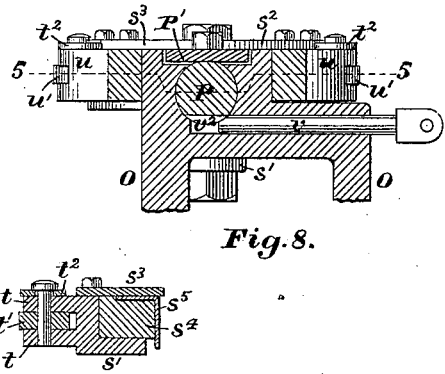
Fig. 8.
Fig. 10.
Witnesses:
E. A. Hemmenway
Walter E. Lombard
Inventor:
Richard C. Lambert
by N. C. Lombard
Attorney.

UNITED STATES PATENT OFFICE.

RICHARD C. LAMBERT, OF BRIDGEWATER, MASSACHUSETTS.

LASTING-MACHINE.

SPECIFICATION forming part of Letters Patent No. 238,791, dated March 15, 1881.

Application filed January 4, 1881. (No model.)

*To all whom it may concern:*

Be it known that I, RICHARD C. LAMBERT, of Bridgewater, in the county of Plymouth and State of Massachusetts, have invented certain new and useful Improvements in Lasting-Machines, of which the following, taken in connection with the accompanying drawings, is a specification.

My invention relates to a machine for lasting boots and shoes; and it consists in certain novel devices and arrangement of parts for straining the upper of the boot or shoe over the last and turning its edge over upon the inner sole in position to be secured thereto by another operation, and to the means employed for adjusting the machine to lasts of different sizes, all of which will be best understood by reference to the description of the drawings, and the claims to be hereinafter given.

Figure 1:
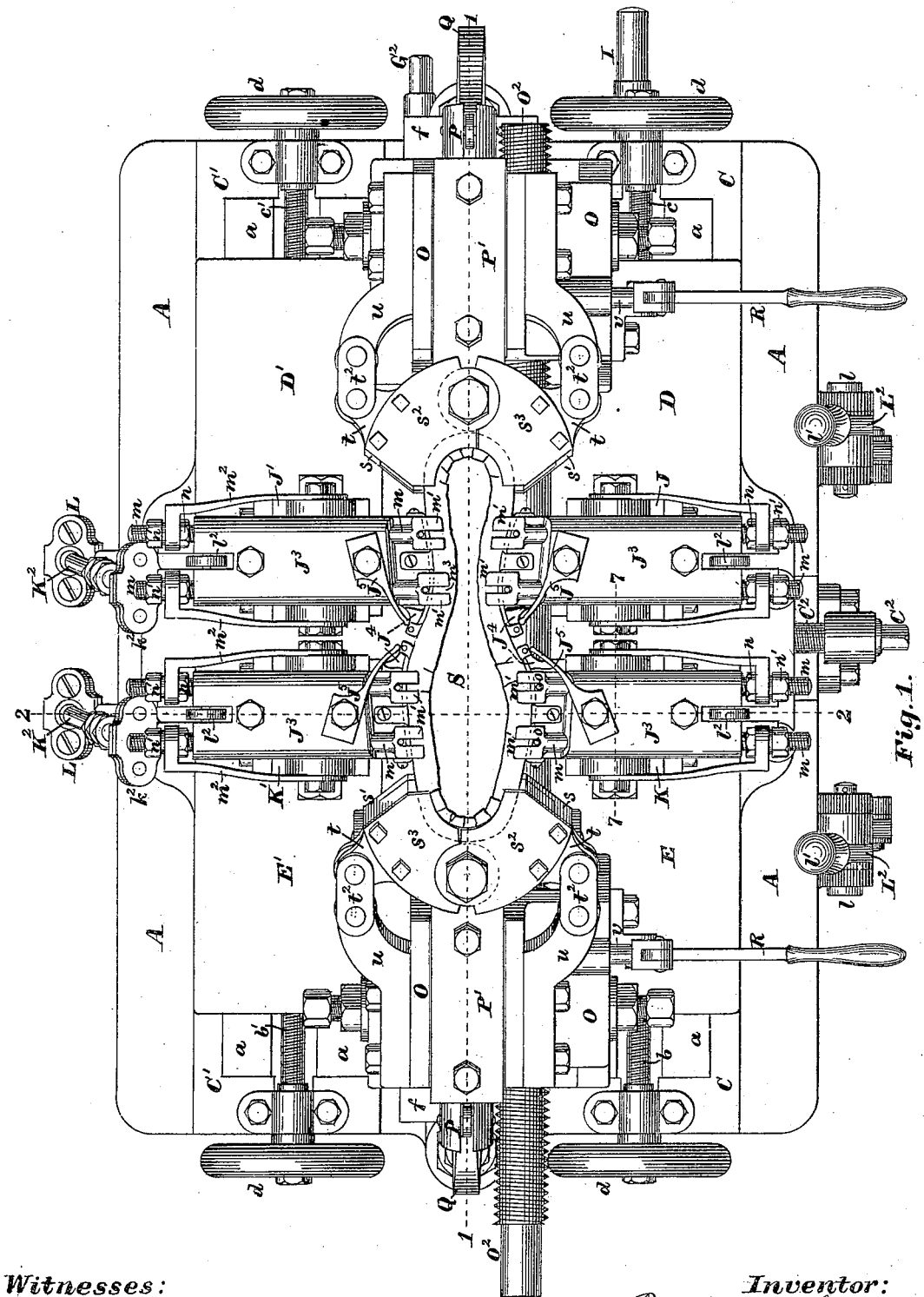
Figure 2:
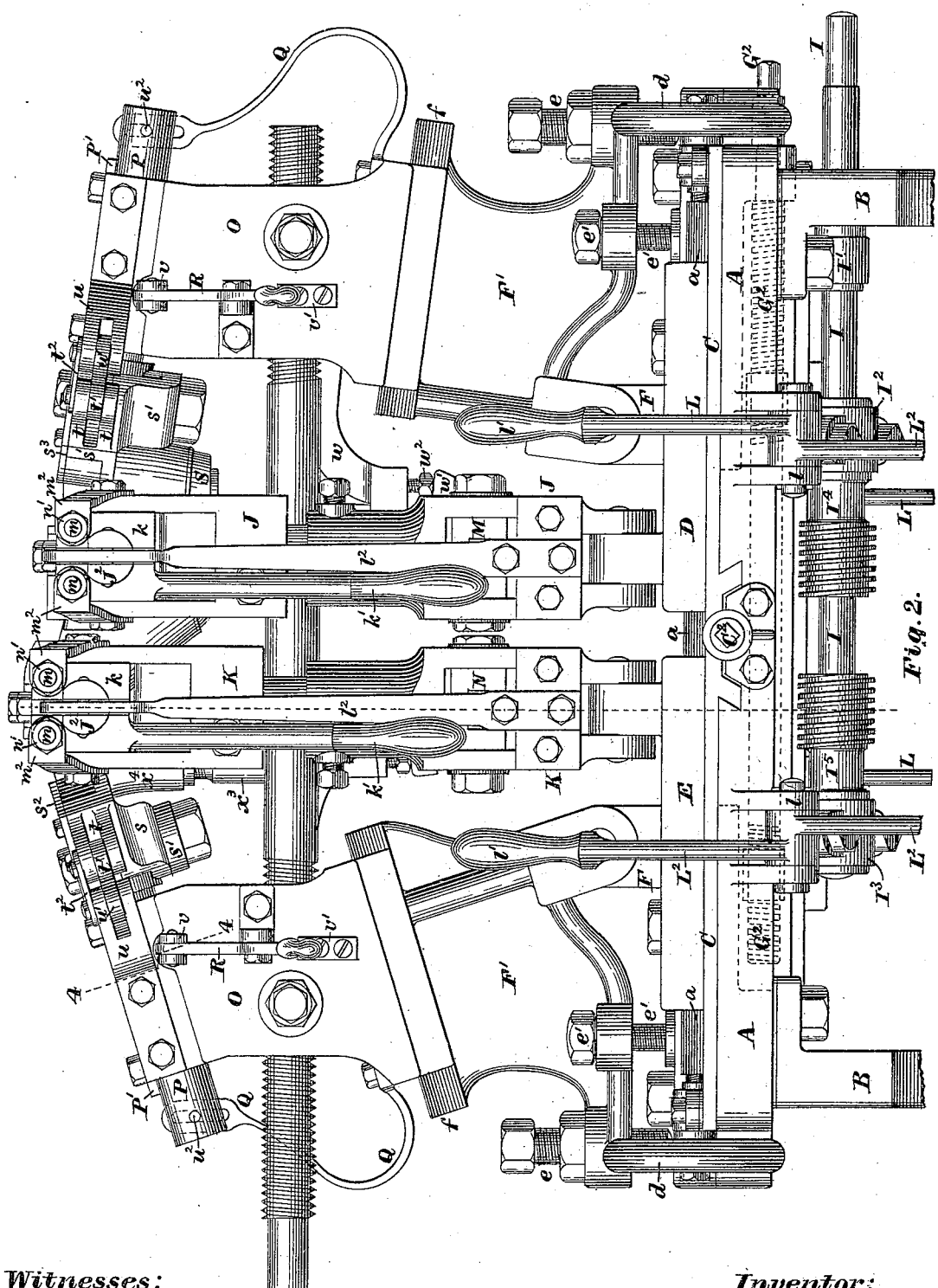
Figure 3:
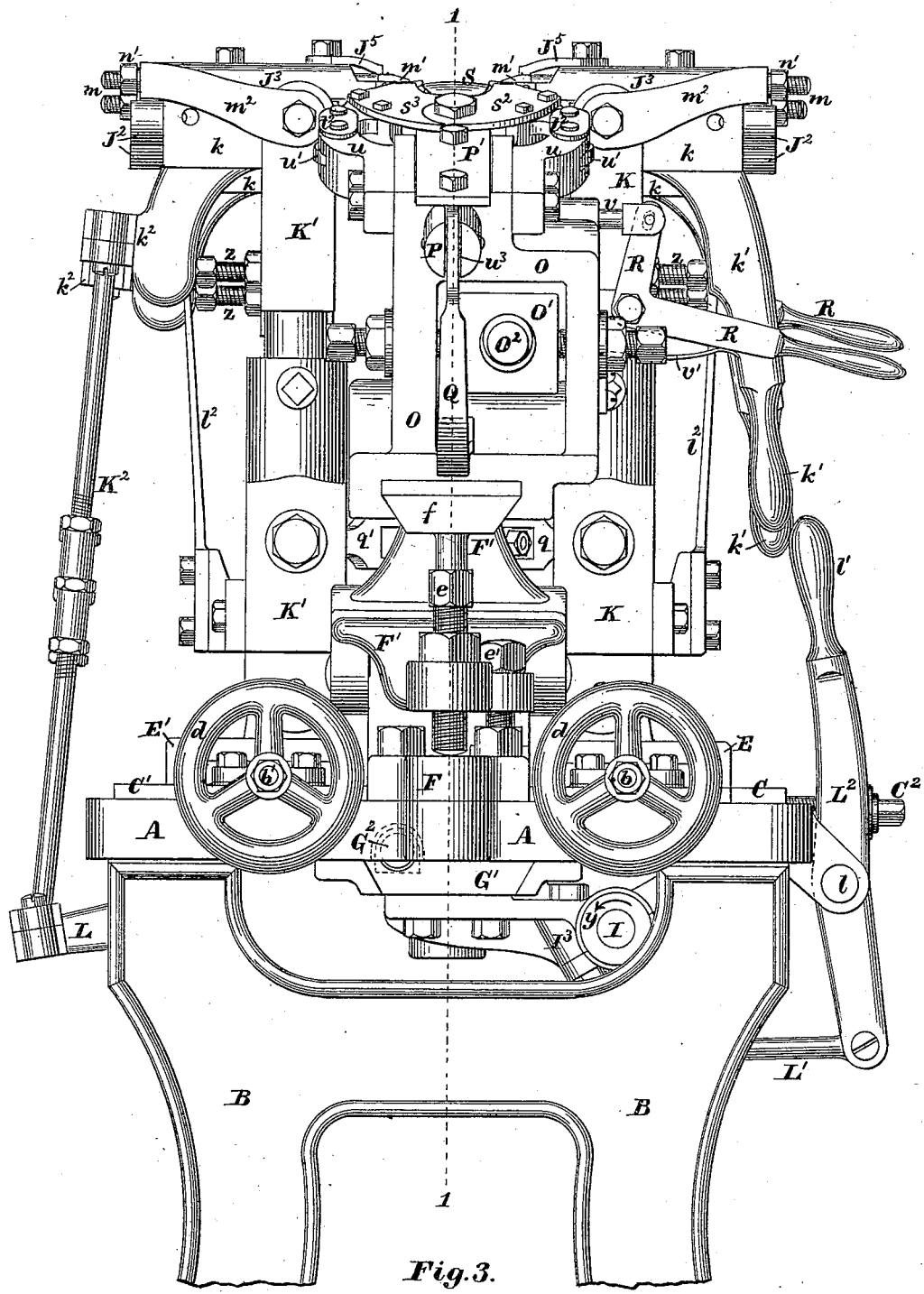
Figure 4:
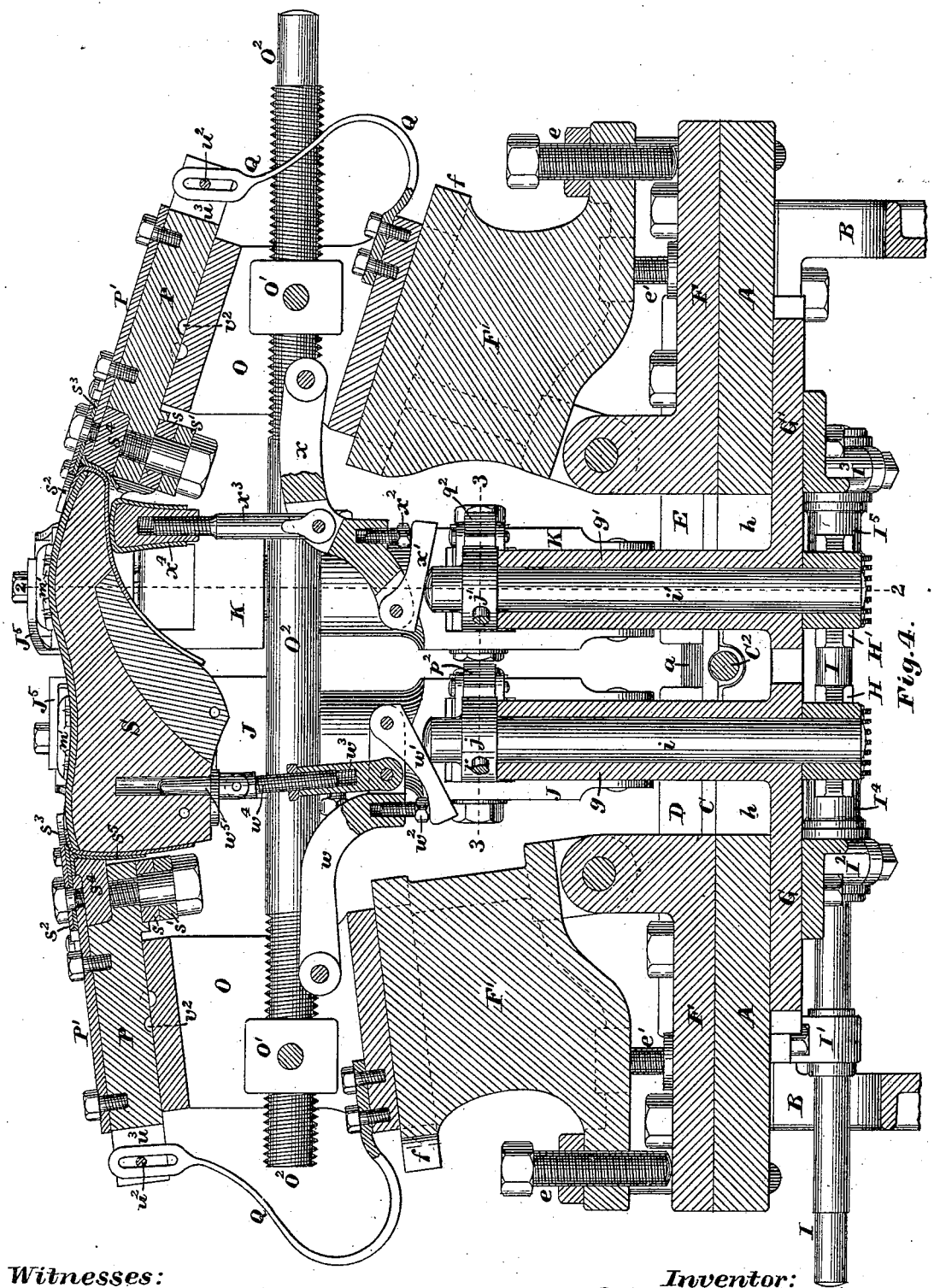
Figure 5:
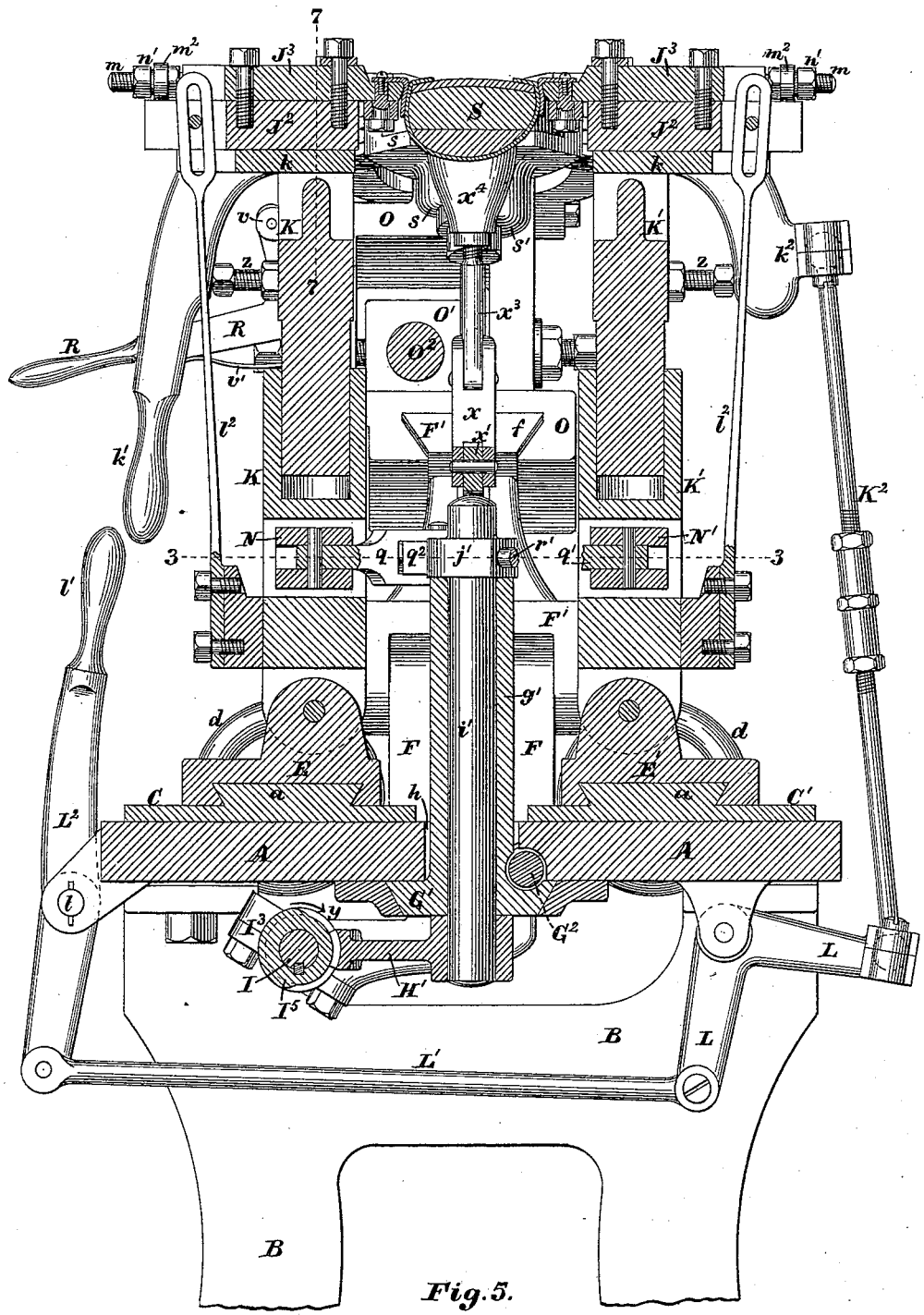

Figure 1 of the drawings is a plan of a machine embodying my invention. Fig. 2 is a front elevation; Fig. 3, an end elevation; Fig. 4, a longitudinal section on line 1 1 on Figs. 1 and 3, looking toward the front of the machine. Fig. 5 is a vertical transverse section on line 2 2 on Figs. 1 and 4. Fig. 6 is a partial horizontal section on line 3 3 on Figs. 4 and 5. Fig. 7 is an elevation of one of the toggle-links and its block-connection with the operating shaft. Fig. 8 is a transverse section through the mechanism for operating the toe folding and crimping mechanism on line 4 4 on Fig. 2. Fig. 9 is a section on line 5 5 on Fig. 8. Fig. 10 is a section on line 6 6 on Fig. 9. Fig. 11 is a section through one of the sets of mechanisms for straining and folding over the sides of the upper, the cutting-plane being on line 7 7 on Figs. 1 and 5. Fig. 12 is a partial plan of the side folders and their carriers. Fig. 13 is an elevation of the inner end of said folding mechanism. Fig. 14 is a section on line 8 8 on Figs. 12 and 13; and Figs. 15, 16, and 17 are partial sections through the last and one of the side folders, and illustrating the relative positions of said folders to the upper of the shoe and the last upon which it is to be folded at three different points in the operation.

A is the table or bed of the machine, supported upon the legs B B, and having formed in its upper surface a dovetailed groove extending transversely thereof, in which are fitted the two plates C and C', which extend from end to end of the table A, and may be adjusted toward and from each other and held in the desired position by the screw-shaft $C^2$, provided with right and left hand screw-threads, which work in nuts formed upon or secured to the under sides of said plates C and C'. The plates C and C' have formed upon their upper sides and extending longitudinally thereof, or at right angles to their line of movement, the raised dovetailed slides $a\ a$, to which are fitted the stands D and E and D' and E', respectively, which may be adjusted upon said slides and held in the desired positions by the screws $b\ c$ and $b'\ c'$, respectively, said screws being mounted in suitable bearings on the plates C and C', and work in nuts formed upon or secured to the under sides of the stands D, E, D', and E', and are each provided with a hand-wheel, $d$, by which it may be revolved. The table A also has secured to its upper surface, in fixed positions between the plates C and C', two stands, F F, one near each end of the table, to each of which is pivoted a stand or bracket, F', adapted to be adjusted about said pivot, and held in any desired position by means of the set-screw $e$ and binding-bolt $e'$, and provided at its upper side with the dovetailed guideway $f$, the purpose of which will hereinafter appear.

In the under side of the table A is formed a longitudinal groove or guideway to receive the two plates G and G', which may be adjusted toward and from each other by means of the screw-shaft $G^2$, provided with right and left hand screw-threads to engage with corresponding nuts formed in or upon or secured to said plates. The plates G and G' have formed upon their inner or contiguous ends the upwardly-projecting cylindrical hubs $g$ and $g'$, respectively, which project through a slot, $h$, extending lengthwise of the table, and form bearings for the vertical shafts $i$ and $i'$, upon the upper ends of which are formed or secured the collars $j$ and $j'$, respectively, and to their lower ends are secured the segments of worm-wheels H and H', respectively. The teeth which engage with the threads of the worms $I^4$ and $I^5$ are so mounted on the shaft I that they may be moved toward and from each other, while at the same time they must revolve with said shaft, and thereby partially revolve the shafts $i$ and $i'$ about their axes. The worm-shaft I is mounted in the fixed bearings I′, and extends through the worm-sleeves $I^4$ and $I^5$, the hubs of which are fitted to bearings in the stands $I^2$ and $I^3$, which are secured, respectively, to the plates G and G′, so as to move therewith when the shafts $i$ and $i'$ are adjusted, the shaft I being provided with a hand-wheel (not shown) by which it may be revolved.

J, K, J′, and K′ are standards, each made in two parts, fitted one within the other, to render their lengths adjustable, and pivoted at their lower ends to the stands D, E, D′, and E′, respectively, and each having pivoted to its upper end a lever, $k$, in the upper portion of each of which is formed a horizontal bearing for supporting a set of the side crimping, stretching, and folding devices, while the lower portions of the two front levers terminate in handles $k'$, by which they may be operated, and the rear levers, $k$, have formed in their lower ends sockets $k^2$, to receive a ball formed upon the upper end of the connecting-rod $K^2$, the lower end of which is, in like manner, connected to the elbow-lever L, pivoted to the under side of the table A, and connected at its other end to the link or rod L′, the opposite end of which is connected to the short arm of the lever $L^2$, which is pivoted at $l$ to the front side of the table A, and is provided at its upper end with the handle $l'$, as shown. Each of the levers $k$ are so mounted in their supporting-standards that they may be vibrated about axes that are substantially parallel with the longitudinal center line of the machine, and each have fitted to a suitable bearing formed for the purpose therein a bolt or cylinder, $J^2$, in such a manner that it may be moved endwise therein, and at the same time be moved slightly about its axis, said cylinders being pressed toward the center of the machine by the spring $l^2$. To the upper sides of each of these cylinders is bolted the plate $J^3$, having drilled longitudinally therethrough two parallel holes, in which are fitted so as to be moved endwise therein two rods, $m\ m$, upon the inner ends of which are formed thin, flat folding-blades $m'\ m'$, and provided at their outer ends with screw-threads to receive the collars $n$ and check-nut $n'$, by means of which and the stirrups $m^2\ m^2$ said rods are connected to the upper ends of the standards J, K, J′, or K′. The inner ends of the plates $J^3$ are reduced in thickness one-half by cutting away their upper sides, and are curved to fit that portion of the last against which they are to bear—$i.\ e$, the plates $J^3$, which are to bear against the ball of the shoe, have their inner ends concave, and those which are to bear upon the shank of the shoe have their inner ends convex.

To the under sides of the plates $J^3$, near their inner ends, are pivoted the pressure-fingers $J^4$, the free ends of which are pressed into contact with the shoe by the springs $J^5$, the face of said fingers next to the shoe and the inner ends of the plates $J^3$ being covered with a flap of leather, secured thereto by the screws $n^2$, $n^3$, and $n^4$, as shown in Fig. 12. Two pointed spurs, $o\ o$, are set in the upper side of the inner end of each of the plates $J^3$, with their points upward and projecting into slots $m^3\ m^3$, formed in the blades $m'\ m'$ of the rods $m\ m$, as shown in Figs. 12, 13, and 14.

The lower sections of the standards J, K, J′, and K′ have cut through them, from front to rear, rectangular openings, in which are pivoted the blocks M, N, M′, and N′, respectively, to which are pivoted the links $p$, $q$, $p'$, and $q'$, the opposite ends of which are pivoted to the swivel-blocks $p^2$, $q^2$, $p^3$, and $q^3$, which have their bearings upon the pins $r$ and $r'$, set in the collars $j$ and $j'$, respectively, of the shafts $i$ and $i'$, all so constructed as to permit a free action of the several parts without binding, whatever may be the angle of the standards J, K, J′, and K′.

Upon the guideway $f$ of the brackets F′ F′ are mounted so as to be moved thereon the carriages O O, which carry the heel and toe crimping and folding mechanisms, said carriages being provided with openings which extend longitudinally through the same, and have pivoted therein the nut-blocks O′ O′, through which the screw-shaft $O^2$, provided with right and left hand threads, works, said screw-shaft having secured upon its left-hand end a hand-wheel (not shown) by which it may be revolved.

The upper sides of the carriages O O have formed therein a bearing to receive the cylindrical, or nearly cylindrical, bolts P P, to the inner ends of each of which are pivoted two recessed segments, $s$ and $s'$, so arranged that they may be vibrated about a common axis arranged at right angles to the axis of said bolt P, or in a perpendicular, or nearly perpendicular, position.

To the upper side of the bolt P is bolted a cap-plate, P′, to the inner end of which is pivoted by a common axis, which coincides with the axis of the segments $s$ and $s'$, the two segmental folding-plates $s^2$ and $s^3$, the back or outer edges of which are bolted to the segments $s$ and $s'$, respectively, in such a manner as to form a chamber between the segments $s\ s'$ and $s^2\ s^3$, open at the inner side, which chamber is filled with rubber $s^4$, which projects inward somewhat farther than the segments $s$ and $s'$, but not quite as far as the segments $s^2$ and $s^3$, as shown in Fig. 10, the inner edge of said rubber being covered by a flap of leather, $s^5$. The segments $s$ and $s'$ are each provided with a slotted ear, $t$, carrying in its slot an anti-friction roll, $t'$, and connected, by the link $t^2$, to the ear $u$, projecting from the side of the carriage O, which ear is also slotted and carries an anti-friction roll, $u'$, which bears against the roll $t'$, as shown in Fig. 9, to reduce the friction.

The bolt P has its outer end slotted to receive the upper end of the spring Q, which is connected therewith by the pin $u^2$ passing through the slot $u^3$ formed in its upper end, the opposite end of said spring being secured to the carriage O, as shown in Fig. 4, the tension of said spring serving to force the bolt P inward, in which condition the segments $s$ $s^2$ and $s'$ $s^3$ are swung outward, and the locking-bolt $v$ is forced, by the spring $v'$, into engagement with the notch $v^2$, formed in the under side of the bolt P, to lock it in such position, the bolt $v$ being pivoted at its outer end to the elbow-lever R, by means of which it may be disengaged from the bolt P at the desired time.

To the carriage O, which carries the heel crimping and folding mechanism, is pivoted a radius-arm, $w$, which projects inward directly over the shaft $i$, and has pivoted to its inner end the incline $w'$, which rests upon the upper end of the shaft $i$, the angle of inclination of its lower edge being determined by the adjusting-screw $w^2$.

To the radius-arm $w$, near its inner end, is pivoted the heel-supporting standard, composed of the socket $w^3$, the threaded bolt $w^4$, adjustable endwise in said socket, and the shouldered pin $w^5$, pivoted to the upper end of the bolt $w^4$, and adapted to enter a hole in the last S, as shown in Fig. 4.

The carriage O, which carries the toe-crimping and folding mechanism, has pivoted thereto the radius-arm $x$, to the inner end of which is pivoted the incline $x'$, the lower edge of which rests upon the upper end of the shaft $i'$, and may be adjusted to a greater or less degree of inclination by means of the screw $x^2$.

To the radius-arm $x$, at or near the middle of its length, is pivoted the bolt $x^3$, provided at its upper end with a male screw-thread, upon which is adjustably mounted the toe-rest $x^4$.

By means of these devices constructed, arranged, and adapted to be adjusted as described, the proper adjustment of the heel and toe supports for the last are rendered entirely automatic; or, in other words, said adjustments of the heel and toe supports are effected by the adjustment of the carriages O O by the rotation of the screw-shaft $O^2$.

It is well understood that the difference between the thickness of two lasts of different sizes bears a certain relation to the difference in length of said lasts, and hence if the inclines $w'$ and $x'$ are properly adjusted the movements of the carriages O O toward each other necessary to change them from the required position for lasting a No. 10 boot or shoe to the proper position for lasting a No. 8 or a No. 6 shoe will cause the heel and toe supports to be raised just the required amount to bring the tread-surface of the last into substantially the same relation to the heel and toe crimping and folding mechanisms as that occupied by the larger last.

The upper surfaces of the folding-blades $m'$ $m'$ are beveled, as shown, so that when they are retracted to the position shown in Fig. 15 the upper edge of the "upper" may be turned outward and pressed upon the points of the spurs $o$ $o$, and when said blades have been raised to the position shown in Fig. 16 and they are moved forward over the last and inner sole, said blades will raise the upper and disengage it from the spurs.

The operation of my improved machine is as follows: The several parts of the machine being in the positions shown in the drawings, with a lasted shoe in position therein, and it being desired to last another shoe of the same or different size, the worm-shaft I is revolved in the direction indicated by the arrow $y$, to move the side crimping and folding devices away from the lasted shoe. The screw-shaft $O^2$ is revolved so as to move the carriages O O with the heel and toe crimping and folding mechanisms away from the lasted shoe till said shoe can be readily removed. This retraction of the heel and toe folding mechanisms, by removing the pressure upon the inner end of the bolts P P, permits said bolts to be moved inward relative to the carriages O O by the tension of the springs Q Q, and thus cause the movable ends of the segments $s$ $s^2$ and $s'$ $s^3$ to be moved outward about their common axis, when the notch $v^2$, in the under side of said bolts P, coming opposite the inner end of the locking-bolt $v$, said bolt is forced inward by the spring $v'$, and, engaging with said notch $v^2$, effectually locks said bolt in such position relative to the carriage O. The lasted shoe is now removed and another last, with a shoe-upper secured in position thereon by a single tack at the toe and another at the heel, is placed in position on the heel and toe supports, the pivoted and jointed construction of which enables their upper ends to be brought into the desired position to receive the last, whether it be a No. 6 or a No. 10. The screw-shaft $O^2$ is now revolved in the opposite direction or so as to move the carriages O O toward each other till the rubber $s^4$, carried by the heel and toe crimping and folding segments, is pressed with considerable force against the heel and toe of the last. The hand-levers $k$ $k$ and $L^2$ $L^2$ are now operated to throw the inner ends of the plates $J^3$ and the folding-blades $m'$ $m'$ downward into the position relative to the last shown in Fig. 15. The worm-shaft I is now revolved in a direction the reverse of that indicated by the arrow $y$ till the inner ends of the plates $J^3$ and the spring-pressed fingers $J^4$ bear against the upper and press it against the last. That portion of the upper which projects above the upper surfaces of the blades $m'$ $m'$ along the sides of the last is now turned outward and downward onto the spurs $o$ $o$, and the levers $k$ $k$ and $L^2$ $L^2$ are operated to raise the inner ends of the plates $J^3$ and blades $m'$ $m'$ till the under surfaces of said blades $m'$ $m'$ are about the thickness of the upper above the upper surface of the inner sole secured upon the last, thus stretching the upper closely around the last, the upward movement of said inner end of the plates $J^3$ being limited and controlled by the adjustable stop-screws $z$. The locking-pins $v$ are now withdrawn from engagement with the bolts P by means of the hand-levers R, and the screw-shaft $O^2$ is again revolved to move the carriages O O still nearer to each other; but as the last prevents any further inward movement of the bolts P to which the folding segments are pivoted, the further inward movement of the carriages O O causes the movable ends of said segments to be swung inward toward each other and crimp and fold the upper over upon the inner sole around the toe and heel. The worm-shaft I is now again revolved in a direction to move the upper ends of the standards D, E, D', and E' inward, which, acting through the stirrups or links $m^2$ $m^2$, causes the rods $m$ $m$ with their blades $m'$ $m'$ to be moved inward, the plates $J^3$ being prevented from moving farther inward by the last and the shoe-upper thereon, against which they bear. This inward movement of the blades $m'$ $m'$ causes, by virtue of their inclined upper surfaces, the upper to be forced off from the spurs $o$ $o$ and turns it over onto the surface of the inner sole. The lasting is now completed except securing the upper to the inner sole, which may be done in any convenient and well-known manner.

The inclines $w'$ and $x'$, instead of bearing upon the shafts $i$ and $i'$, may bear upon any fixed part of the machine provided for the purpose.

What I claim as new, and desire to secure by Letters Patent of the United States, is—

1. In a boot and shoe lasting machine, the segment of rubber $s^4$ interposed between and moving with the heel and toe crimping jaws or segments $s$ $s'$ and $s^2$ $s^3$ substantially as described.

2. The combination of the carriage O, bolt P, segments $s$ $s'$ and $s^2$ $s^3$, pivoted to and movable with said bolt, and the links $t^2$ $t^2$, connecting said segments to the carriage, substantially as and for the purposes described.

3. The combination of the carriage O, bolt P, provided with the notch $v^2$, the segments $s$ $s'$ and $s^2$ $s^3$, pivoted by a common center to the bolt P and having their movable ends connected to said carriage, the spring Q, the locking-bolt $v$, the hand-lever R, and the spring $v'$, all arranged and adapted to operate substantially as described.

4. The carriage O, carrying the heel or toe crimping and folding jaws or segments, and adapted to be adjusted toward and from the center of the machine, in combination with the pivoted bracket or stand F', and means of adjusting said bracket about its pivotal axis, substantially as described.

5. In combination with the carriage O, carrying the heel crimping and folding jaws or segments, and mechanism for adjusting said carriage toward and from the center of the machine, the radius-arm $w$, pivoted incline $w'$, adjusting-screw $w^2$, the heel-supporting standard $w^3$ $w^4$ $w^5$, and the bearing-support $i$, for said incline $w'$, all arranged and adapted to operate as and for the purposes described.

6. In combination with the carriage O, carrying the toe crimping and folding jaws or segments, and mechanism for moving said carriage toward and from the center of the machine, the radius-arm $x$, pivoted incline $x'$, adjusting-screw $x^2$, the toe-supporting standard $x^3$ $x^4$, and the bearing-support $i'$ for said incline $x'$, all arranged and operating substantially as described.

7. As a means of moving the side crimping and folding devices toward and from the center of the machine, the combination of a pivoted standard carrying said folding and crimping devices and provided with a pivoted or swiveling block, a vertical revolving shaft provided at its upper end with a radially-projecting pin or bolt, a swiveling block mounted upon said pin, and a toggle-link connecting said block carried by the shaft with the swiveling block carried by the standard, substantially as described.

8. The combination, in a boot and shoe lasting machine, of an upright pivoted standard, the lever $k$, pivoted to the upper end of said standard, the reciprocating bolt $J^2$, having secured thereon and movable therewith the plate $J^3$, the spring $l^2$, one or more blades, $m$ $m'$, having their bearing in said plate $J^3$, one or more stirrups or links, $m^2$, connecting said blade $m$ $m'$ to the upper end of the standard, and mechanism, substantially as described, for vibrating said standard around its pivotal bearing, all combined, arranged, and adapted to operate substantially as and for the purposes described.

9. In combination with the reciprocating and vibrating plate $J^3$ and folding-blades $m'$, one or more pointed spurs, $o$, constructed, arranged, and adapted to operate substantially as and for the purposes described.

10. In combination with the reciprocating and vibrating plate $J^3$, the spring-actuated finger $J^4$, pivoted to the under side of said plate, and adapted to operate substantially as described.

11. In combination with the reciprocating and vibrating plate $J^3$, provided with one or more spurs, $o$, the folding-blade $m$ $m'$, provided with the slot $m^3$, and having the forward part of its upper surface inclined or beveled, substantially as and for the purposes described.

Executed at Boston, Massachusetts, this 1st day of January, A. D. 1881.

RICHARD C. LAMBERT.

Witnesses:
W. E. LOMBARD,
E. E. CHANDLER.